US011985655B2

(12) United States Patent
Zhu et al.

(10) Patent No.: US 11,985,655 B2
(45) Date of Patent: May 14, 2024

(54) METHOD AND NETWORK ELEMENT OF SCHEDULING UPLINK REFERENCE SIGNAL RESOURCE

(71) Applicant: Telefonaktiebolaget LM Ericsson (publ), Stockholm (SE)

(72) Inventors: Huaisong Zhu, Beijing (CN); Yanyan Zhu, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 443 days.

(21) Appl. No.: 17/290,071

(22) PCT Filed: Nov. 5, 2018

(86) PCT No.: PCT/CN2018/113972
§ 371 (c)(1),
(2) Date: Apr. 29, 2021

(87) PCT Pub. No.: WO2020/093198
PCT Pub. Date: May 14, 2020

(65) Prior Publication Data
US 2021/0400694 A1  Dec. 23, 2021

(51) Int. Cl.
*H04W 72/1268* (2023.01)
*H04B 7/0452* (2017.01)
*H04L 5/00* (2006.01)

(52) U.S. Cl.
CPC ...... *H04W 72/1268* (2013.01); *H04B 7/0452* (2013.01); *H04L 5/0051* (2013.01)

(58) Field of Classification Search
CPC .......... H04W 72/04; H04W 72/1268; H04B 7/0452; H04L 5/0051; H04L 5/00;
(Continued)

(56) References Cited

U.S. PATENT DOCUMENTS 8,131,306 B2 * 3/2012 Ho .................. H04W 72/51
455/452.2
2014/0204770 A1 7/2014 Mondal et al.
(Continued)

FOREIGN PATENT DOCUMENTS

CN 101405973 A 4/2009
CN 102264129 B 6/2015
(Continued)

OTHER PUBLICATIONS

3GPP, "3GPP TS 36.213 V15.3.0", 3rd Generation Partnership Project; Technical Specification Group Radio Access Network; Evolved Universal Terrestrial Radio Access (E-UTRA); Physical layer procedures (Release 15), Sep. 2018, 1-546.
(Continued)

*Primary Examiner* — Mohamed A Kamara
(74) *Attorney, Agent, or Firm* — Weisberg I.P. Law, P.A.

(57) ABSTRACT

The present disclosure proposes a method, a network element, and a non-transitory computer readable storage medium of scheduling a UL RS resource for an MU-MIMO enabled UE. The method is performed at a network element to schedule a UL RS resource for an MU-MIMO enabled UE. The method comprises: determining whether channel status information for the UE is known or not; assigning a first RS resource from a first RS group to the UE in response to determining that the channel status information for the UE is unknown and that the first RS resource is not assigned to any other UE; and assigning a second RS resource from a second RS group to the UE in response to determining that the channel status information for the UE is known.

17 Claims, 5 Drawing Sheets

(58) Field of Classification Search
CPC ... H04L 5/0023; H04L 5/0048; H04L 5/0092; H04L 5/0094
See application file for complete search history.

(56) References Cited

U.S. PATENT DOCUMENTS

| | | | |
|---|---|---|---|
| 2014/0211767 A1 | 7/2014 | Lunttila et al. | |
| 2014/0241240 A1* | 8/2014 | Kloper | H04B 7/024 370/328 |
| 2015/0295694 A1* | 10/2015 | Li | H04L 5/0057 370/329 |
| 2016/0308646 A1* | 10/2016 | Qiao | H04W 72/23 |
| 2018/0242243 A1* | 8/2018 | Kela | H04L 5/0057 |
| 2019/0159182 A1* | 5/2019 | Ranta-Aho | H04W 16/12 |
| 2019/0341976 A1* | 11/2019 | Nam | H04B 7/0617 |
| 2019/0393999 A1* | 12/2019 | Hasegawa | H04L 27/26 |

FOREIGN PATENT DOCUMENTS

| | | | | |
|---|---|---|---|---|
| CN | 107079416 A | * | 8/2017 | ............ H04B 7/026 |
| CN | 107294682 A | | 10/2017 | |
| EP | 2916607 A1 | | 9/2015 | |
| EP | 3068060 A1 | | 9/2016 | |
| WO | WO-2010098409 A1 | * | 9/2010 | ............ H04L 1/0026 |
| WO | 2013028703 A1 | | 2/2013 | |
| WO | 2015090463 A1 | | 6/2015 | |
| WO | 2017171314 A1 | | 10/2017 | |

OTHER PUBLICATIONS

Huawei, "Updated text proposal on discussion [NR-AH1801#21][NR] 38.331 ASN.1 review part 3—L2 params (Huawei)", 3GPP TSG-RAN WG2 Meeting #101, R2-1804016, Athens, Greece, Feb. 26-Mar. 2, 2018, 1-287.

EPO Communication with Supplementary European Search Report dated Jun. 7, 2022 for Patent Application No. 18939607.0, consisting of 11-pages.

3GPP TSG RAN WG1 Meeting 90bis R1-1717417; Title: Codebook based UL transmission; Agenda Item: 7.2.1.2; Source: ZTE, Sanechips; Document for: Discussion and Decision; Date and Location: Oct. 9-13, 2017, Prague, CZ, consisting of 6-pages.

Chinese Office Action with English Machine Translation dated Nov. 20, 2023 for Patent Application No. 201880099181.4, consisting of 12-pages.

* cited by examiner

METHOD AND NETWORK ELEMENT OF SCHEDULING UPLINK REFERENCE SIGNAL RESOURCE

TECHNICAL FIELD

The present disclosure generally relates to the field of communication technology, and in particular, to a method and a network element of scheduling uplink (UL) reference signal (RS) resource for a multi-user multi-input-multi-output (MU-MIMO) enabled user equipment (UE).

BACKGROUND

This section introduces aspects that may facilitate better understanding of the disclosure. Accordingly, the statements of this section are to be read in this light and are not to be understood as admissions about what is in the prior art or what is not in the prior art.

With fast growth of global telecommunication markets and increasing demands for speed and throughput of telecommunication equipment, telecommunication operators are required to provide network access with even higher speed and throughput. One way to provide such network access is to use the Massive MIMO technology.

The Massive MIMO technology makes a clean break with current practice through the use of a very large number of service antennas that are operated fully coherently and adaptively. Extra antennas help by focusing the transmission and reception of signal energy into ever-smaller regions of space. This brings huge improvements in throughput and energy efficiency, in particularly when combined with simultaneous scheduling of a large number of user terminals (e.g., tens or hundreds). Other benefits of massive MIMO include support for MU-MIMO.

MU-MIMO is a set of multiple-input and multiple-output (MIMO) technologies for wireless communication, in which a set of users or wireless terminals, each with one or more antennas, communicate with each other. In contrast, single-user MIMO (SU-MIMO) only considers a single multi-antenna transmitter communicating with a single multi-antenna receiver. In a similar way that Orthogonal Frequency Division Multiple Access (OFDMA) adds multiple access (multi-user) capabilities to Orthogonal Frequency Division Multiplexing (OFDM), MU-MIMO adds multiple access (multi-user) capabilities to MIMO. In other words, with MU-MIMO enabled, Multiple UEs at different positions can simultaneously access a network with exactly same frequency/time resources. The Massive MIMO can provide asymptotically orthogonal channels to the UEs, and experiments have so far not disclosed any limitations in this regard.

While massive MIMO renders many traditional research problems irrelevant, it uncovers entirely new problems that urgently need attention, for example, the need for efficient reference resource assignment.

SUMMARY

According to some embodiments of the present disclosure, a method, a network element, and a non-transitory computer readable storage medium of scheduling a UL RS resource for an MU-MIMO enabled UE are provided.

According to a first aspect of the present disclosure, a method at a network element of scheduling a UL RS resource for an MU-MIMO enabled UE. The method comprises: determining whether channel status information for the UE is known or not; assigning a first RS resource from a first RS group to the UE in response to determining that the channel status information for the UE is unknown and that the first RS resource is not assigned to any other UE; and assigning a second RS resource from a second RS group to the UE in response to determining that the channel status information for the UE is known.

In some embodiments, the first RS group has more RS resources than those of the second RS group. In some embodiments, both of the first RS group and the second RS group are Demodulation Reference Signal (DMRS) group. In some embodiments, the method further comprises: receiving UL transmission from the UE; determining the channel status information for the UE based on the demodulation of the DMRS from the UL transmission; and storing the channel status information for the UE. In some embodiments, the second RS resource is an RS resource previously assigned to another UE by the network element. In some embodiments, the method further comprises: coordinating UL communications from the UE and the other UE based on the known channel status information for the UE and the other UE. In some embodiments, the step of coordinating UL communications from the UE and the other UE based on the known channel status information for the UE and the other UE comprises: coordinating UL communications from the UE and the other UE based on the known channel status information for the UE and the other UE by using the Zero-Forcing (ZF) algorithm or the Minimum Mean Square Error (MMSE) algorithm.

In some embodiments, prior to the step of determining whether channel status information for the UE is known or not, the method further comprises: receiving a request for UL RS resource for the UE; and adding the UE into a candidate list. In some embodiments, the step of determining whether channel status information for the UE is known or not comprises: determining whether channel status information for the UE is known or not in response to determining that the UE is the one with the highest priority in the candidate list. In some embodiments, the method further comprises: removing the UE from the candidate list in response to determining that the channel status information for the UE is unknown and that all RS resources from the first RS group have been assigned to other UEs.

In some embodiments, the method further comprises: updating channel status information for UEs for which first RS resources from the first RS group are assigned in response to determining that an MU-MIMO transmission is completed. In some embodiments, the method further comprises: removing channel status information for a UE to which the first RS resources and/or the second RS resources are assigned, in response to determining that the channel status information for the UE is out-of-date. In some embodiments, the channel status information is determined to be out-of-date by determining that the difference between the last update time for the channel status information and the current time is greater than or equal to a predetermined threshold.

In some embodiments, the method further comprises: assigning a third RS resource from a third RS group to the UE in response to determining that the UL transmission from the UE which is assigned with the first RS resources and/or the second RS resources occupies more than a first predetermined ratio of the total UL resources. In some embodiments, the method further comprises: de-assigning the third RS resource from the UE in response to determining that the UL transmission from the UE which is assigned with the second RS resource occupies less than a second predetermined ratio of the total UL resources. In some embodiments, the third RS group is a Sounding Reference Signal (SRS) group.

According to another aspect of the present disclosure, a network element is provided. The Network element comprises: a processor; a memory storing instructions which, when executed by the processor, cause the processor to perform the steps of the method according to the method of the first aspect.

According to yet another aspect of the present disclosure, a non-transitory computer readable storage medium is provided. The non-transitory computer readable storage medium stores instructions which, when executed by one or more processors, cause the one or more processors to perform the steps of the method according to the method of the first aspect.

Additional aspects of the present disclosure will be set forth, in part, in the detailed description, figures, and any claims which follow, and in part will be derived from the detailed description, or can be learned by practice of the invention. It is to be understood that both the foregoing general description and the following detailed description are exemplary and explanatory only and are not restrictive of the present disclosure.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and therefore are not to be considered limiting of its scope, the disclosure will be described with additional specificity and detail through use of the accompanying drawings.

DETAILED DESCRIPTION

Hereinafter, the present disclosure is described with reference to embodiments shown in the attached drawings. However, it is to be understood that those descriptions are just provided for illustrative purpose, rather than limiting the present disclosure. Further, in the following, descriptions of known structures and techniques are omitted so as not to unnecessarily obscure the concept of the present disclosure.

Those skilled in the art will appreciate that the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof. It will be also understood that the terms "connect(s)," "connecting", "connected", etc. when used herein, just means that there is an electrical or communicative connection between two elements and they can be connected either directly or indirectly, unless explicitly stated to the contrary.

Of course, the present disclosure may be carried out in other specific ways than those herein set forth without departing from the scope and essential characteristics of the invention. One or more of the specific processes discussed below may be carried out in any communications transceiver comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

Although multiple embodiments of the present disclosure will be illustrated in the accompanying Drawings and described in the following Detailed Description, it should be understood that the invention is not limited to the disclosed embodiments, but instead is also capable of numerous rearrangements, modifications, and substitutions without departing from the present disclosure that as will be set forth and defined within the claims.

Further, please note that although the following description of some embodiments of the present disclosure is given in the context of Long Term Evolution (LTE), the present disclosure is not limited thereto. In fact, as long as MU-MIMO is involved, the inventive concept of the present disclosure may be applicable to any appropriate communication architecture, for example, to Global System for Mobile Communications (GSM)/General Packet Radio Service (GPRS), Enhanced Data Rates for GSM Evolution (EDGE), Code Division Multiple Access (CDMA), Wideband CDMA (WCDMA), Time Division-Synchronous CDMA (TD-SCDMA), CDMA2000, Worldwide Interoperability for Microwave Access (WiMAX), Wireless Fidelity (Wi-Fi), 5$^{th}$ Generation New Radio (5G NR), etc. Therefore, one skilled in the arts could readily understand that the terms used herein may also refer to their equivalents in any other infrastructure. For example, the term "User Equipment" or "UE" used herein may refer to a mobile device, a mobile terminal, a mobile station, a user device, a user terminal, or any other equivalents. For another example, the term "eNodeB" or "eNB" used herein may refer to a base station, a base transceiver station, an access point, a hot spot, a NodeB, an Evolved NodeB, a gNB, a network element, or any other equivalents. Furthermore, please note that although the following description of some embodiments of the present disclosure is given in the context of DMRS and/or SRS, the present disclosure is not limited thereto.

Figure 1:
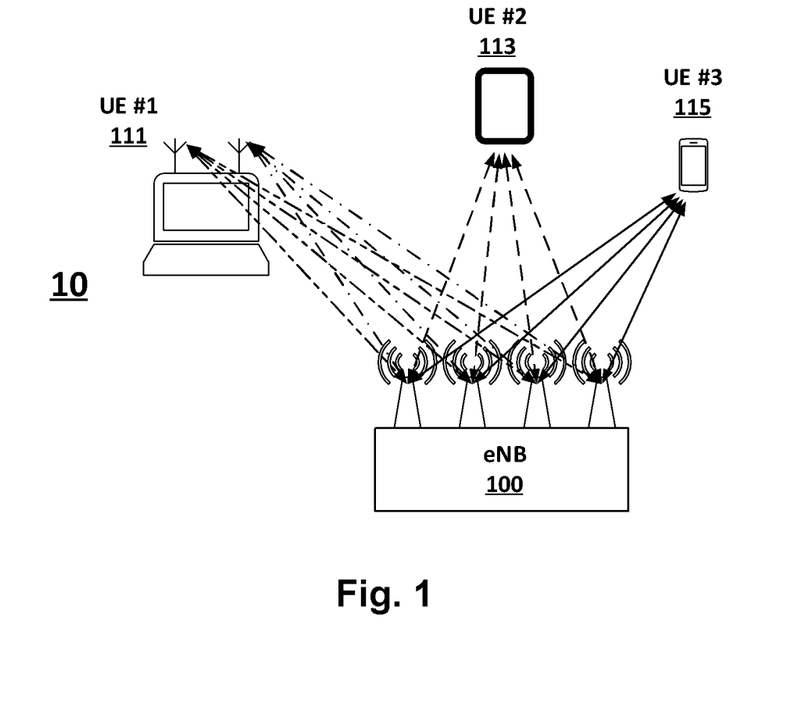
FIG. 1 is a diagram illustrating an exemplary Multi-User Multi-Input-Multi-Output (MU-MIMO) enabled communication system according to an embodiment of the present disclosure.

FIG. 1 is a diagram illustrating an exemplary Multi-User Multi-Input-Multi-Output (MU-MIMO) enabled communication system 10 according to an embodiment of the present disclosure. As shown in FIG. 1, the communication system 10 may comprise, for example, an eNB 100 and one or more UEs. Although only three UEs 111, 113, and 115 and one eNB 100 are shown in FIG. 1, the present disclosure is not limited thereto. In some other embodiments, one or more UEs may be served by one or more eNBs, collaboratively or separately.

Referring to FIG. 1, three UEs are shown as UE #1 (for example, a laptop PC) 111, UE #2 (for example, a tablet) 113, and UE #3 (for example, a smart phone) 115, respectively. The UE #1 111 may have multiple transmission/reception antennas, for example, two antennas as shown in FIG. 1, and each of the UE #2 113 and the UE #3 115 may have one transmission/reception antenna. Further, the eNB 100 may have multiple transmission/reception antennas, for example, four antennas as shown in FIG. 1. Please note that the number of antennas of each node (e.g. UE, eNB, or any other node) in the communication system 10 is given for illustration purpose only, and therefore the present disclosure is not limited thereto.

As shown in FIG. 1, the eNB 100 and the UEs 111, 113, and 115 form a MU-MIMO system. In the downlink, there are four transmission antennas at the eNB100 and four reception antennas at the UEs (two at UE #1 111, one at UE #2 113, and the last one at UE #3 115). Similarly, in the uplink, there are four transmission antennas at the UEs (two at UE #1 111, one at UE #2 113, and the last one at UE #3 115) and four reception antennas at the eNB100. In this case, this MU-MIMO system can be described mathematically by the following equation (1) in either UL or DL:

$$\begin{bmatrix} R_1 \\ R_2 \\ R_3 \\ R_4 \end{bmatrix} = \begin{bmatrix} H_{11} & H_{12} & H_{13} & H_{14} \\ H_{21} & H_{22} & H_{23} & H_{24} \\ H_{31} & H_{32} & H_{33} & H_{34} \\ H_{41} & H_{42} & H_{43} & H_{44} \end{bmatrix} \begin{bmatrix} T_1 \\ T_2 \\ T_3 \\ T_4 \end{bmatrix} \quad (1)$$

where $R_i$ denotes the signal received at the i$^{th}$ reception antenna, $T_j$ denotes the signal transmitted from the j$^{th}$ transmission antenna, and $H_{ij}$ denotes the element at the i$^{th}$ row and the j$^{th}$ column of the channel matrix H. By using multiple radio chains/antennas, MU-MIMO can control the phased antenna pattern to control both the areas of maximum constructive interference—where the signal is the strongest—and maximum destructive interference—where the signal is the weakest. With a sufficient number of antennas and knowledge about the relative positions of all associated user equipment, the eNB 100 can create a phased pattern to talk to multiple UEs both independently and simultaneously.

To support MU-MIMO in uplink, two solutions have been proposed to acquire UL channel state information or the UL channel matrix H for a UE: i.e. SRS-based uplink MU_MIMO and DMRS-based uplink MU_MIMO. They will be described in detail with reference to FIG. 2.

Figure 2:
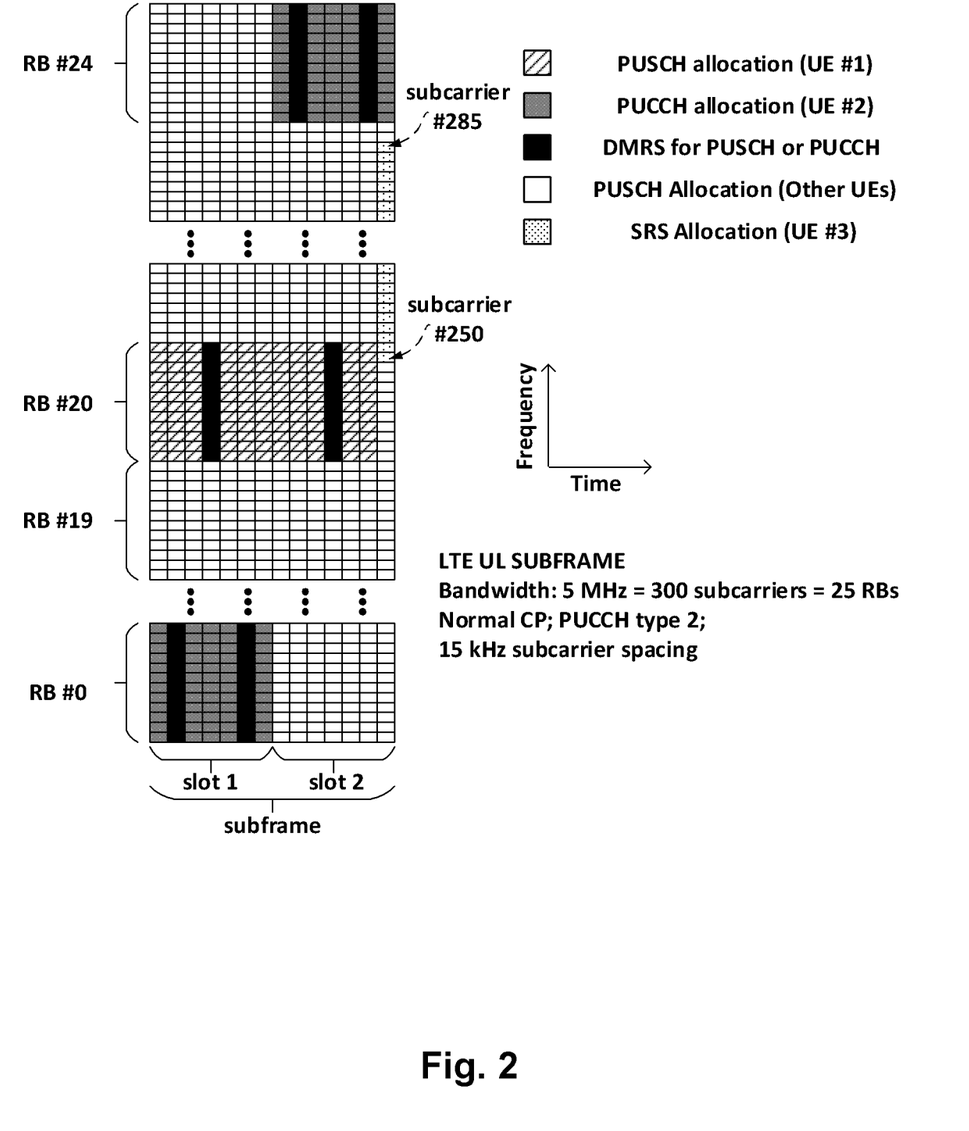
FIG. 2 is a diagram illustrating an exemplary time-frequency resource grid according to the present disclosure.

FIG. 2 is a diagram illustrating an exemplary time-frequency resource grid managed by the eNB 100 according to the present disclosure. For example, each of time-frequency resource grids shown in FIG. 2 is a resource grid which occupies a frequency bandwidth of 5 MHz and a time duration of 1 ms. In a typical LTE configuration where a resource block (RB) is 180 kHz wide in frequency domain and 1 slot (0.5 ms) long in time domain, there are totally 25 RBs (e.g. RBs #0-#24) for each slot.

Sounding Reference Signal (SRS) Based Uplink MU-MIMO

This solution will trigger a UE to periodically or aperiodically transmit sounding signals on specified bandwidth. For example, as shown in FIG. 2, SRS resources of subcarrier 250 to 285 in the slot 2 of FIG. 2 is assigned to the UE #3 115. Accordingly, eNB 100 may determine the channel state information for the UE #3 115 before the UE #3 115 transmits other signals, for example, PUCCH/PUSCH signals. However, drawbacks of this solution are obvious: the eNB 100 cannot accurately estimate UE #3 115's behaviors beforehand. In this case, the eNB 100 can only have 2 choices: (i) assigning a lot of sounding resources to make all possible UEs (e.g. UE #1 111, UE #2 113, and UE #3 115) transmit sounding signals in advance. This will result in too much unnecessary sounding channel interferences, more UEs' power consumption, and of course, waste of valuable uplink sounding resources; or (ii) triggering a sounding procedure when it confirms some UE (e.g. UE #3 115) needs uplink transmission. However, this confirmation needs time, and the sounding procedure also needs time. Therefore, this choice will inevitably introduce delay, and the delay will in turn make MU-MIMO possibility degrade and reduce MU-MIMO potential.

Accordingly, SRS based uplink MU-MIMO has to struggle between the delay and the resource waste.

Demodulation Reference Signal (DMRS) Based Uplink MU-MIMO

This solution will not (or at least not mandatorily) trigger UE to transmit sounding signals in advance, but directly use demodulation reference signals to determine the channel status information. For example, as shown in FIG. 2, PUSCH resources of both slots of RB #20 are assigned to UE #1 111, and PUCCH resources of PUCCH index 0 of the whole subframe are assigned to UE #2 113. After that, the eNB 100 may use this information to do spatial processing, i.e. increase desired signal strength and decrease un-desired interference. However, drawbacks of this solution are: DMRS resource is too limited to support MU-MIMO.

For Massive MIMO, up to 16 UEs can be supported to operate in the MU-MIMO mode (i.e. to access same physical radio resources simultaneously by merely spatial multiplexing). Some experiments in field shows even 48 layers can be achievable for 64 TRX Massive MIMO in some certain scenarios. This suggests that tens of UEs need to operate in the MU-MIMO mode, i.e. tens of UEs' DMRS resources should be orthogonal to each other to be distinguishable by the eNB. However, according to the specification of LTE, a maximum of 8 orthogonal DMRS can be used for an uplink transmission, and according to current specification of NR, this number can be increased. But logically, due to shorter DMRS symbol length in NR, the maximum number of possible orthogonal DMRS is also limited. For example, with a 60 kHz subcarrier configuration in NR, the length of a DMRS symbol is 16.7 μs, and each UE will have some delay spread, which is normally about 1 μs in a typical urban environment. Therefore, the theoretical limit of the number of orthogonal DMRS is 16.7/1≈16 or 17, which is still less than the MU-MIMO requirement.

Accordingly, DMRS based uplink MU-MIMO is not enough for MU-MIMO capacity requirement.

Therefore, to support MU-MIMO, a solution for efficiently scheduling UL RS resources is required. Accordingly, some embodiments of the present application propose such a solution. In general, available orthogonal DMRS resources are split into 2 (or more) groups. For example, in a typical LTE scenario, a total 8 DMRS resources may be divided into two groups. One group (Group 1) may have 7 or 6 DMRS resources and the other group (Group 2) may have 1 or 2 DMRS resource accordingly. For another example, in a typical NR scenario, a total 24 DMRS resources may be divided into two groups. One group (Group 1) may have 23 or 22 DMRS resources and the other group (Group 2) may have 1 or 2 DMRS resource. Group 1 may be used for DMRS based MU-MIMO. Further, channel status information acquired after demodulation from these DMRS may be stored, just like sounding, for later usage. Further, for those scheduled UEs who equipped with sounding resources or just acquired channel status information from DMRS in previous Transmission Time Interval (TTI), a DMRS resource will be assigned from Group 2.

However, please note that if multiple UEs are assigned with a same DMRS resource, the channel status information can no longer be determined based on this DMRS resource. Therefore, once channel status information for a UE, to which Group 2 resource is assigned, is out-of-date, the UE may use DMRS resources from Group 1 or SRS resources to support MU-MIMO.

Further, when a UE is assigned a unique DMRS resource for one transmission (i.e. the DMRS resource is not assigned to any other UE, and therefore the channel status information may be acquired based on the DMRS resource), spatial characteristics detection information will be valid for a short period for the UE, for example, about 20 subsequent transmissions can use this information directly without any SRS resource or other DMRS resources. Therefore, for any UE to which a DMRS resource from Group 1 is assigned, the UE may be assigned a DMRS resource from Group 2 for the following 20 transmissions, for example.

In some embodiments, if a certain UE occupies resources of Group 1 and/or Group 2 exceeding a predefined threshold (e.g. 25% or any other appropriate percentage) for a time duration, and no sounding resources are assigned to this UE, the eNB may try to assign some sounding resources to this UE. In some other embodiments, if a certain UE occupies resources of Group 2 below another predefined threshold (e.g. 0% or any other appropriate percentage) for another time duration, the sounding resources may be de-assigned from this UE.

Next, a solution of scheduling UL RS resources for an MU-MIMO enabled UE will be described in detail with reference to FIG. 3.

Figure 3:
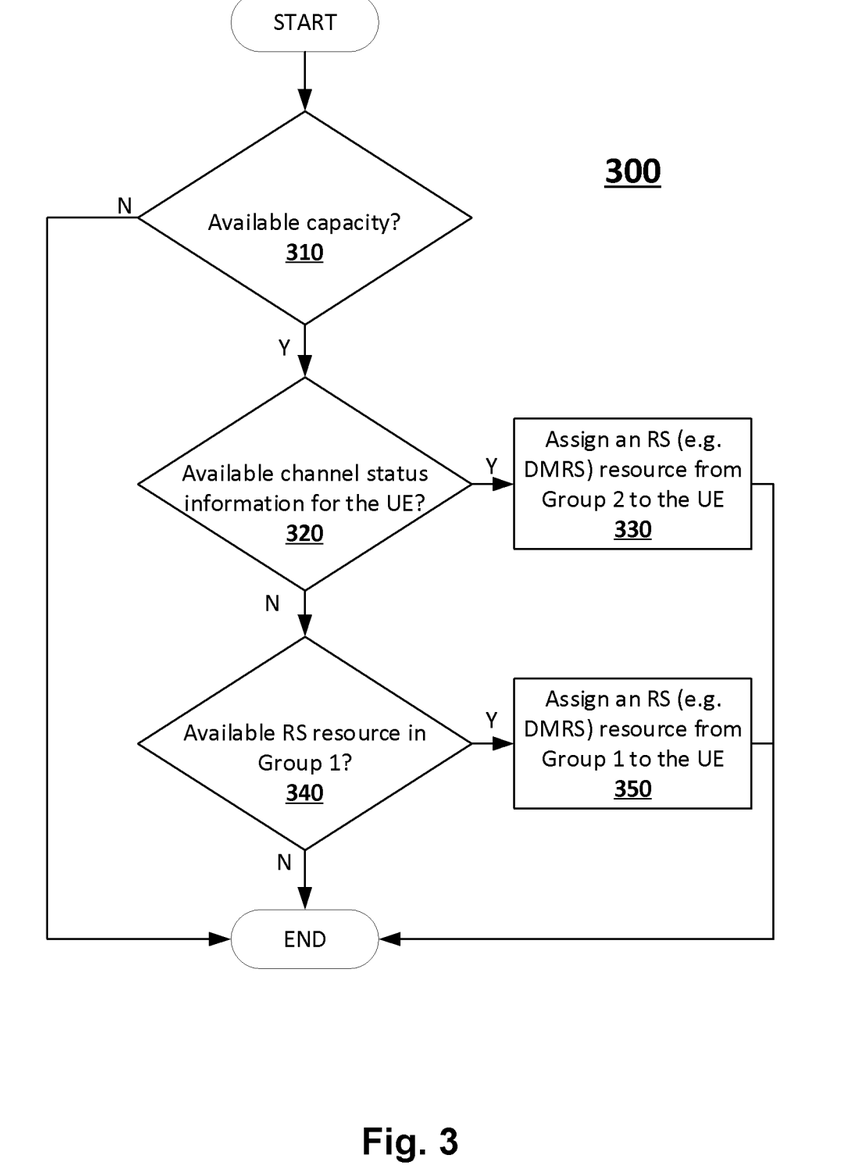
FIG. 3 is a flow chart illustrating an exemplary method of scheduling a UL RS resource for a MU-MIMO enabled UE according to an embodiment of the present disclosure.

FIG. 3 is a flow chart illustrating an exemplary method 300 at an eNB of scheduling a UL RS resource for a MU-MIMO enabled UE according to an embodiment of the present disclosure.

Typically, the eNB (e.g. the eNB 100) may maintain a candidate list of UEs which are requesting for RS resources to support their UL MU-MIMO communications. Please note that such requests may not be initiated by the UEs per se. Instead, in some embodiments, the eNB may proactively add some UEs into this candidate list if necessary. Further, in some other embodiments, the eNB may not maintain such a candidate list, but handle the requests immediately or in real time, and therefore such a candidate list is not necessary in such a situation.

In some embodiments, the eNB may first check whether there is any UE in the candidate list. If there is no UE requesting the UL RS resources or MU-MIMO, then the method 300 may not be started. Once there is any UE in the candidate list, the eNB may choose one UE from the candidate list based on some predefined criteria, e.g. priority, time order, etc., and the method 300 begins.

At step 310, the eNB may check its MU-MIMO capacity has run out or not. If there is no available capacity for MU-MIMO, then the method 300 ends and the UE may stay in the candidate list for later re-scheduling or be removed from the candidate list. If it is determined at step 310 that there is available MU-MIMO capacity, then the method 300 proceeds to step 320 where the eNB may check whether the channel status information for this UE is known or unknown at the eNB.

If channel status information for this UE is known, then at step 330, a DMRS resource from Group 2 may be assigned to this UE. In the embodiment of FIG. 3, even if this DMRS resource is already assigned to another UE, this DMRS can still be assigned to the current UE because the eNB has already known the channel status information for this UE and the other UE and the eNB can use MU-MIMO processing capability to eliminate inter-UE interference, for example, by the zero-forcing algorithm or the minimum mean square error (MMSE) algorithm. Anyway, the UE' MU-MIMO performance can be guaranteed in such a situation.

If it is determined at step 320 that the channel status information for this UE is unknown, then the method proceeds to step 340 where the eNB may check whether there is any available DMRS resource in Group 1. If yes, this UE will be assigned with un-used orthogonal DMRS from Group 1 at step 350. If no, it means that all available orthogonal DMRS have been utilized by other UEs (e.g. with higher priorities) and the method 300 ends. This UE may stay in the candidate list for later re-scheduling or be removed from the candidate list.

Further, in some embodiments, once a UE finishes its MU-MIMO transmission, the eNB may either update the channel status information for all UEs, which have been assigned with orthogonal DMRS from Group 1, or remove all out-of-date channel status information, or both. In some embodiments, the criteria for determining whether some channel status information is out-of-date or not is whether the difference between the last update time of channel status information and the current time exceeds a certain threshold or not. As an example, the threshold may have a value in a range of 10 ms to 20 ms.

With such a solution, one or more UEs whose channel status information is known to the eNB may share the very same DMRS to enable MU-MIMO operations, and other UEs whose channel status information is unknown to the eNB may use the rest DMRS which outnumber the available DMRS in any existing solution under the same situation.

Figure 4:
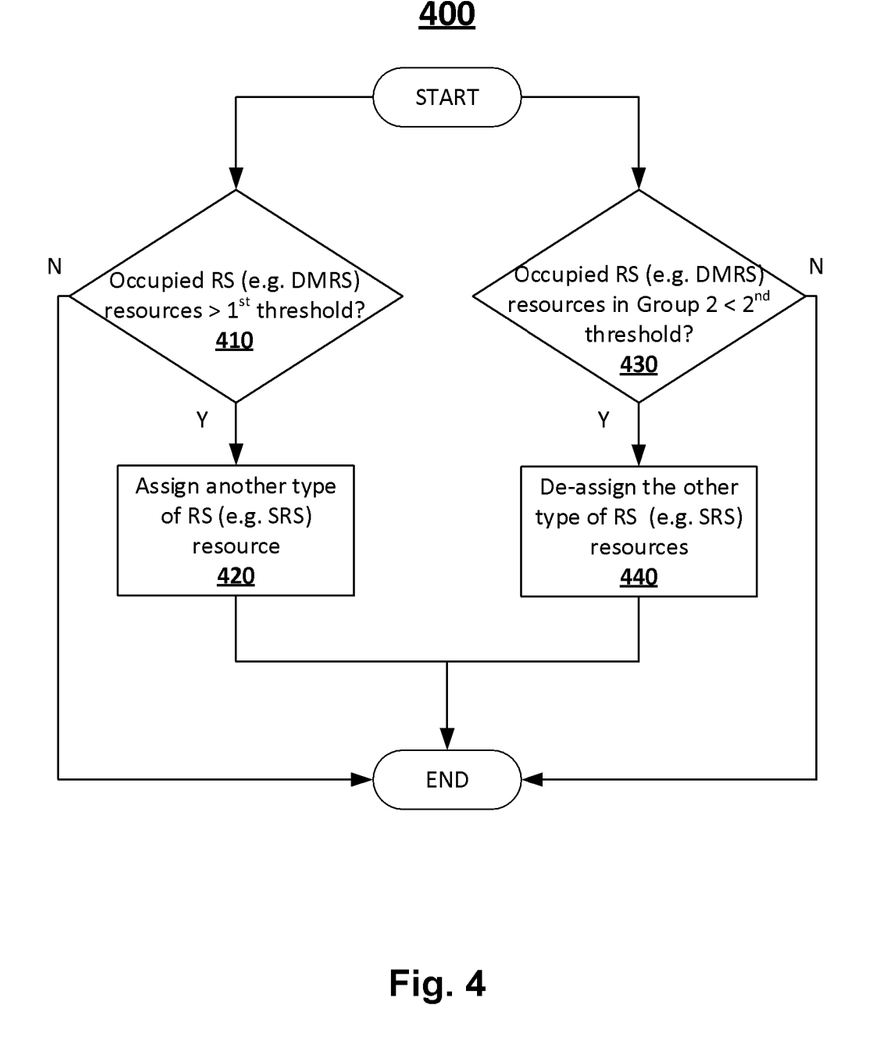
FIG. 4 is a flow chart illustrating an exemplary method of scheduling another type of RS resource for a MU-MIMO enabled UE according to an embodiment of the present disclosure.

FIG. 4 is a flow chart illustrating an exemplary method 400 of scheduling another type of RS resource (e.g. SRS resource) for a MU-MIMO enabled UE according to an embodiment of the present disclosure.

The method 400 begins at step S410 and/or S430. In other words, step S410 and step S430 may be performed in any order, e.g. sequentially, in parallel, or any other order. For example, in an embodiment, step S410 may be performed by the eNB first, and then the step S430 may be performed, or vice versa. In another embodiment, step S410 and step S430 may be performed in parallel. In yet another embodiment, the method 400 may be performed by the eNB without step S410/S420 or step S430/S440 performed. In other words, in some embodiments, step S410/S420 and step S430/S440 may be two independent branches which may be performed by the eNB separately and independently. However, in some other embodiments, they may be performed sequentially and correlately.

At step S410, the eNB may determine whether a certain UE occupies the resources of Group 1 and/or Group 2 exceeding a predefined threshold (e.g. 25% or any other appropriate percentage) for a time duration. For example, in an embodiment where the UE is not assigned with any SRS resource, if the UE is requesting for UL DMRS resources from the eNB for MU-MIMO UL transmissions, the eNB may check the usage of the DMRS resources occupied by the UE in Group 1 (e.g. when the eNB has no previous channel status information for the UE), Group 2 (e.g. when the eNB has previous channel status information for the UE), or Group 1 and Group 2 (e.g. when the eNB first has previous channel status information for the UE but later the channel status information is expired, e.g. due to the 10 ms to 20 ms limit as mentioned above).

If the result is yes at step S410 (Y of step S410), it implies that this UE always requires DMRS resources to be operated in the MU-MIMO mode. In other words, at this time, sounding resources may be more efficient than DMRS resources for this UE. Therefore, at step S420, sounding resources may be assigned to this UE, and then the method 400 ends. Further, if it is determined at step S410 that no UE occupies the resources of Group 1 and/or Group 2 exceeding a predefined threshold (e.g. 25% or any other appropriate percentage) for a time duration (N of step S410), then the method 400 ends.

At step S430, the eNB may determine whether a certain UE with sounding resource assigned occupies resources of Group 2 is less than another predefined threshold (e.g. 5% or any other appropriate percentage) for a time duration. If yes (Y of step S430), it implies that this UE doesn't use the DMRS resource assigned thereto efficiently for MU-MIMO (e.g. due to low traffic volume), then the sounding resources assigned to this UE may be de-assigned from this UE at step S440, and the method 400 ends. Further, if it is determined at step S430 that no UE occupies resources of Group 2 below the other predefined threshold (e.g. 5% or any other appropriate percentage) for a time duration (N of step S410), then the method 400 ends.

As mentioned above, in an embodiment where step S410 and step S430 are performed sequentially and correlately, if the eNB performs step S410 and finds that the occupied RS resources in Group 2 are greater than the first threshold (e.g. 25% or any other appropriate percentage), the eNB may omit step S430/S440 since the occupied RS resources in Group 2 is definitely not less than the second threshold (e.g. 5% or any other appropriate percentage). For another example, if the eNB performs step S430 and finds that the occupied RS resources in Group 2 are less than the second threshold (e.g. 5% or any other appropriate percentage), the eNB may omit, or at least partially omit, step S410/S420 since the occupied RS resources in Group 2 is definitely not greater than the first threshold (e.g. 25% or any other appropriate percentage).

With the method 400, the utilization of the UL RS resource can be further improved and MU-MIMO operations of more UEs may be supported.

Figure 5:
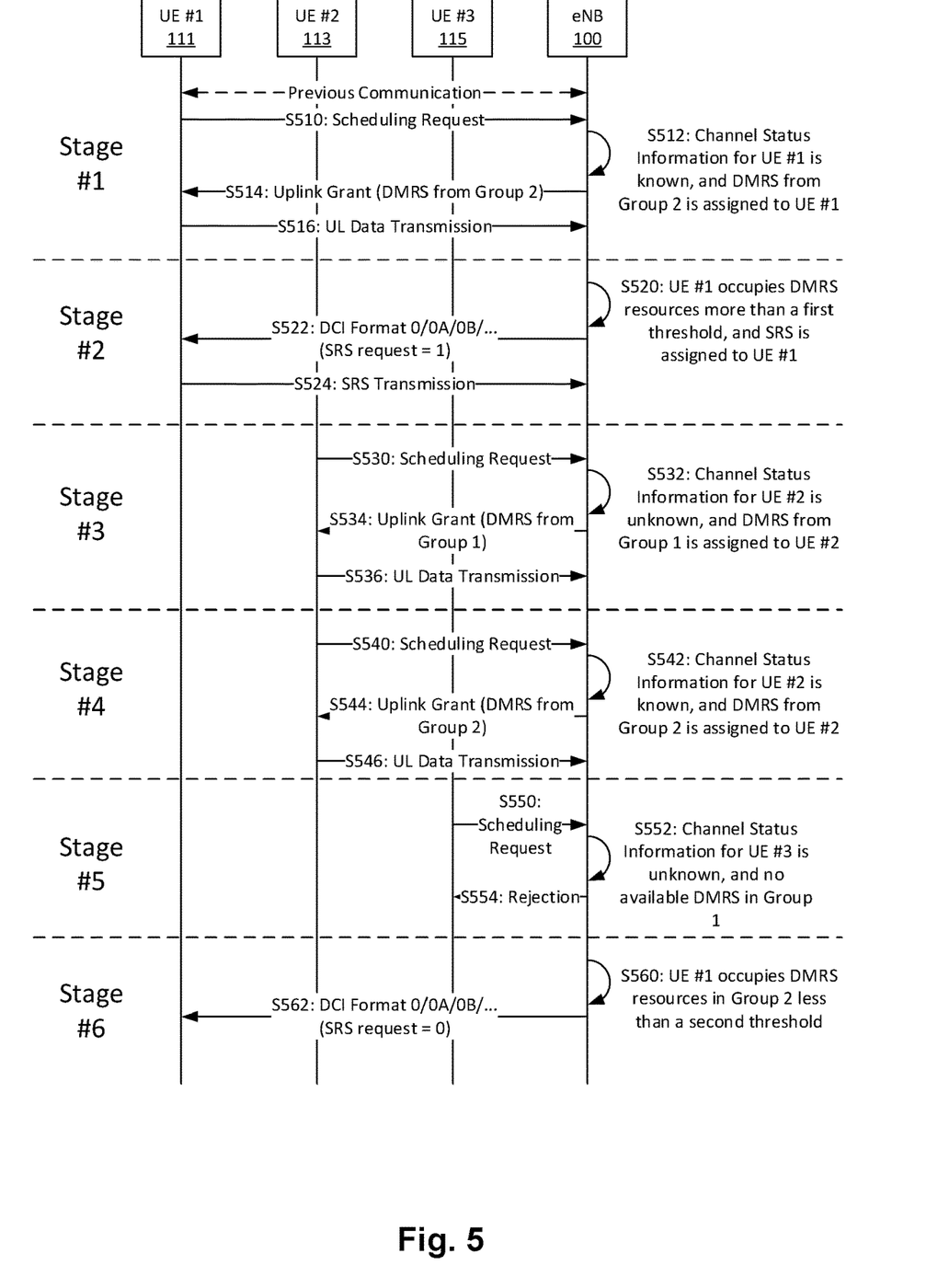
FIG. 5 is a diagram illustrating exemplary message flows between UEs and an eNB for scheduling UL RS resources according to an embodiment of the present disclosure.

FIG. 5 is a diagram illustrating an exemplary message flow between UE #1 111, UE #2 113, UE #3 115, and an eNB 100 for scheduling UL RS resources according to an embodiment of the present disclosure. As shown in FIG. 5, the message flow may be divided into Stages #1-#6. Please note that each stage may be described as an independent embodiment, and some or all the stages may be combined into one embodiment where appropriate.

Before the step S510, UE #1 111 may be conducting a MU-MIMO transmission with the eNB 100 and therefore the eNB 100 may already know the uplink channel status information for UE #1 111, for example, by assigning a unique DMRS resource or SRS resource to the UE #1 111. At step S510, UE #1 111 may have some UL data to be transmitted, and therefore it transmits a scheduling request (SR) to the eNB 100 to request for UL resources for the transmission. At step S512, upon receipt of the SR, the eNB 100 checks whether the channel status information for UE #1 111 is known or not, for example, according to the method described with reference to FIG. 3. Since the channel status information for UE #1 111 is already known at the eNB 100 as mentioned earlier, the eNB 100 may assign a DMRS resource from Group 2 to UE #1 111, for example, via an Uplink Grant message in which a DMRS resource to be used by UE #1 111 is specified at step S514. At step S516, the UE #1 111, upon receipt of the UL grant which assigns the DMRS resource from Group 2, may transmit its UL data (e.g. PUSCH as shown in FIG. 2) together with the assigned DMRS to the eNB 100.

In this embodiment or some other embodiment, the eNB 100 may monitors the utilization of the assigned DMRS resource. For example, when the eNB 100 determines that the utilization of the assigned DMRS resource exceeds a predetermined threshold, for example, 25% (or any other appropriate percentage) of the total utilization of all DMRS resources, for example, due to a heavy UL traffic from the UE #1 111 to eNB 100, the eNB 100 may determine that another type of RS (e.g. SRS) resources may be assigned to this UE #1 111 at step S520. Therefore, the eNB 100 may transmits a control message to the UE #1 111 to assign a periodic or aperiodic SRS resource to the UE #1 111 at step S522. For example, a Downlink Control Information (DCI) message (e.g. DCI Formats 0/0A/0B/0C/1A/2B . . . as provisioned in 3GPP TS 36.213, v15.3.0, 2018-09) may be transmitted to the UE #1 111 to assign some SRS resources. In these DCI messages, the field "SRS request" may be set to indicate that an SRS resource is assigned or de-assigned. In the embodiment shown in FIG. 5, the field "SRS request" may be set to "1" to indicate some SRS resource is assigned to the UE #1 111. Upon receipt of this control message, the UE #1 111 may transmit SRS signals, for example, the SRS allocation as shown in FIG. 2, at step S524.

In this embodiment or some other embodiment, another UE, e.g. UE #2 113, may also have some UL data to be transmitted, and therefore at step S530 it transmits a scheduling request (SR) to the eNB 100 to request for UL resources for the transmission as well. At step S532, upon receipt of the SR, the eNB 100 checks whether the channel status information for UE #2 113 is known or not, for example, according to the method described with reference to FIG. 3. Since the channel status information for UE #2

113 is unknown at the eNB 100, the eNB 100 may check whether there is available DMRS resource in Group 1, determine that there is available DMRS resource in Group 1, and assign the available DMRS resource from Group 1 to UE #2 113, for example, via a Uplink Grant message in which a DMRS resource to be used by UE #2 113 is specified at step S534. At step S536, the UE #2 113, upon receipt of the UL grant which assigns the DMRS resource from Group 1, may transmit its UL data (e.g. PUCCH as shown in FIG. 2) together with the assigned DMRS to the eNB 100.

In this embodiment or some other embodiment, UE #2 113 may have some further UL data to be transmitted, and therefore at step S540 it transmits a scheduling request (SR) to the eNB 100 to request for UL resources for the transmission again. At step S542, upon receipt of the SR, the eNB 100 checks whether the channel status information for UE #2 113 is known or not, for example, according to the method described with reference to FIG. 3. Since the channel status information for UE #2 113 is already known at the eNB 100, the eNB 100 may assign the DMRS resource from Group 2 to UE #2 113, for example, via an Uplink Grant message in which a DMRS resource to be used by UE #2 113 is specified at step S544. Please note that the DMRS resource assigned to UE #2 113 may be same as the DMRS resource assigned to UE #1 111 because the channel status information for both UE #1 111 and UE #2 113 are known and the eNB 100 may use some algorithms (e.g. Zero-Forcing, MMSE, etc.) to eliminate the inter-UE interference between the UE #1 111 and UE #2 113 based on the known channel status information for the UEs. At step S546, the UE #2 113, upon receipt of the UL grant which assigns the DMRS resource from Group 2, may transmit its UL data (e.g. PUSCH as shown in FIG. 2) together with the assigned DMRS to the eNB 100.

In this embodiment or some other embodiment, yet another UE, e.g. UE #3 115, may also have some UL data to be transmitted, and therefore at step S550 it transmits a scheduling request (SR) to the eNB 100 to request for UL resources for the transmission as well. At step S552, upon receipt of the SR, the eNB 100 checks whether the channel status information for UE #2 113 is known or not, for example, according to the method described with reference to FIG. 3. Since the channel status information for UE #3 115 is unknown at the eNB 100, the eNB 100 may check whether there is available DMRS resource in Group 1, determine that there is no available DMRS resource in Group 1, and reject the SR at step S554.

In this embodiment or some other embodiment, the eNB 100 may monitors the utilization of the assigned DMRS resource. For example, when the eNB 100 determines that the utilization of the DMRS resource assigned to UE #1 111 drops below a predetermined threshold (e.g. different from the above threshold), for example, 5% (or any other appropriate percentage) of the total utilization of all DMRS resources, for example, due to no UL traffic from the UE #1 111 to eNB 100, the eNB 100 may determine that the other type of RS (e.g. SRS) resources may be de-assigned from the UE #1 111 at step S560. Therefore, the eNB 100 may transmits a control message to the UE #1 111 to de-assign the previously assigned SRS resource from the UE #1 111 at step S562. For example, a Downlink Control Information (DCI) message (e.g. DCI Formats 0/0A/0B/0C/1A/2B . . . as provisioned in 3GPP TS 36.213, v15.3.0, 2018-09) may be transmitted to the UE #1 111 to de-assign some SRS resources. In these DCI messages, the field "SRS request" may be set to "0" to indicate that an SRS resource is assigned or de-assigned. In the embodiment shown in FIG. 5, the field "SRS request" is set to 0 to indicate some SRS resource is de-assigned from the UE #1 111. Upon receipt of this control message, the UE #1 111 may stop transmitting the SRS signals.

In this way, MU-MIMO with massive users can be supported with limited DMRS resources and sounding resources.

Figure 6:
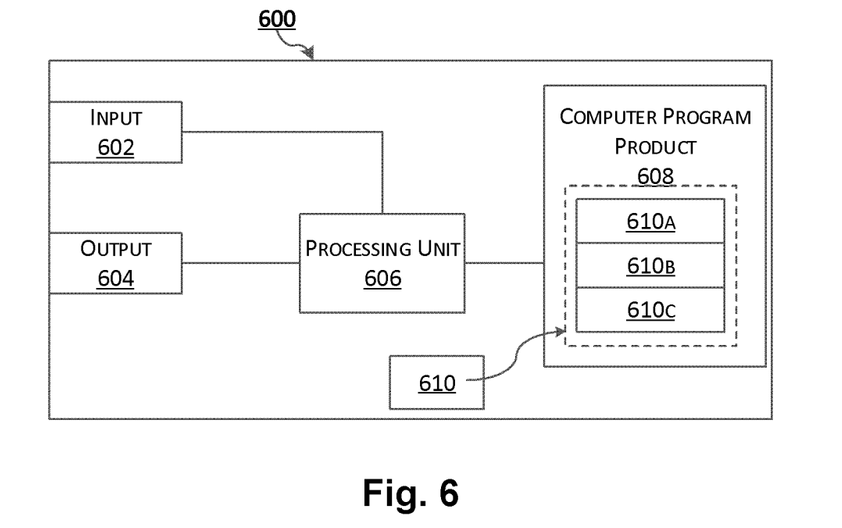
FIG. 6 is a block diagram illustrating an exemplary arrangement which may be used in a network element according to an embodiment of the present disclosure.

FIG. 6 schematically shows an embodiment of an arrangement 600 which may be used in a network element according to an embodiment of the present disclosure.

Comprised in the arrangement 600 are a processing unit 606, e.g., with a Digital Signal Processor (DSP) or a Central Processing Unit (CPU). The processing unit 606 may be a single unit or a plurality of units to perform different actions of procedures described herein. The arrangement 600 may also comprise an input unit 602 for receiving signals from other entities, and an output unit 604 for providing signal(s) to other entities. The input unit 602 and the output unit 604 may be arranged as an integrated entity or as separate entities.

Furthermore, the arrangement 600 may comprise at least one computer program product 608 in the form of a non-volatile or volatile memory, e.g., an Electrically Erasable Programmable Read-Only Memory (EEPROM), a flash memory and/or a hard drive. The computer program product 608 comprises a computer program 610, which comprises code/computer readable instructions, which when executed by the processing unit 606 in the arrangement 600 causes the arrangement 600 and/or the network element and/or the UE in which it is comprised to perform the actions, e.g., of the procedure described earlier in conjunction with FIGS. 3-5 or any other variant.

The computer program 610 may be configured as a computer program code structured in computer program modules 610A-610C. Hence, in an exemplifying embodiment when the arrangement 600 is used in the network element, the code in the computer program of the arrangement 600 includes: a determination module 610A for determining whether channel status information for the UE is known or not. The code in the computer program further includes a first assignment module 610B for assigning a first RS resource from a first RS group to the UE in response to determining that the channel status information for the UE is unknown and that the first RS resource is not assigned to any other UE. The code in the computer program further includes a second assignment module 610C for assigning a second RS resource from a second RS group to the UE in response to determining that the channel status information for the UE is known.

The computer program modules could essentially perform the actions of the flow illustrated in FIGS. 3-5, to emulate the network element. In other words, when the different computer program modules are executed in the processing unit 606, they may correspond to different modules in the network element or the UE.

Although the code means in the embodiments disclosed above in conjunction with FIG. 6 are implemented as computer program modules which when executed in the processing unit causes the arrangement to perform the actions described above in conjunction with the figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories within the UE.

The present disclosure is described above with reference to the embodiments thereof. However, those embodiments are provided just for illustrative purpose, rather than limiting the present disclosure. The scope of the disclosure is defined by the attached claims as well as equivalents thereof. Those skilled in the art can make various alternations and modifications without departing from the scope of the disclosure, which all fall into the scope of the disclosure.

What is claimed is:

1. A method at a network element of scheduling an uplink (UL) reference signal (RS) resource for a multi-user multi-input-multi-output (MU-MIMO) enabled user equipment (UE), the method comprising:
    determining whether channel status information for the UE is known or not;
    assigning a first RS resource from a first RS group to the UE in response to determining that the channel status information for the UE is unknown and that the first RS resource is not assigned to any other UE;
    assigning a second RS resource from a second RS group to the UE in response to determining that the channel status information for the UE is known; and
    updating channel status information for UEs for which first RS resources from the first RS group are assigned in response to determining that an MU-MIMO transmission is completed.

2. The method according to claim 1, wherein the first RS group has more RS resources than those of the second RS group.

3. The method according to claim 1, wherein both of the first RS group and the second RS group are Demodulation Reference Signal (DMRS) groups.

4. The method according to claim 3, further comprising:
    receiving UL transmission from the UE;
    determining the channel status information for the UE based on the demodulation of the DMRS from the UL transmission; and
    storing the channel status information for the UE.

5. The method according to claim 1, wherein the second RS resource is an RS resource previously assigned to another UE by the network element.

6. The method according to claim 5, further comprising:
    coordinating UL communications from the UE and the other UE based on the known channel status information for the UE and the other UE.

7. The method according to claim 6, wherein the step of coordinating UL communications from the UE and the other UE based on the known channel status information for the UE and the other UE comprises:
    coordinating UL communications from the UE and the other UE based on the known channel status information for the UE and the other UE by using the Zero-Forcing (ZF) algorithm or the Minimum Mean Square Error (MMSE) algorithm.

8. The method according to claim 1, wherein prior to the step of determining whether channel status information for the UE is known or not, the method further comprises:
    receiving a request for UL RS resource for the UE; and
    adding the UE into a candidate list.

9. The method according to claim 8, wherein the step of determining whether channel status information for the UE is known or not comprises:
    determining whether channel status information for the UE is known or not in response to determining that the UE is the one with the highest priority in the candidate list.

10. The method according to claim 8, further comprising:
    removing the UE from the candidate list in response to determining that the channel status information for the UE is unknown and that all RS resources from the first RS group have been assigned to other UEs.

11. The method according to claim 1, further comprising:
    removing channel status information for a UE to which the first RS resources and/or the second RS resources are assigned, in response to determining that the channel status information for the UE is out-of-date.

12. The method according to claim 11, wherein channel status information is determined to be out-of-date by determining that the difference between the last update time for the channel status information and the current time is greater than or equal to a predetermined threshold.

13. The method according to claim 1, further comprising:
    assigning a third RS resource from a third RS group to the UE in response to determining that the UL transmission from the UE which is assigned with the first RS resources and/or the second RS resources occupies more than a first predetermined ratio of the total UL resources.

14. The method according to claim 13, further comprising:
    de-assigning the third RS resource from the UE in response to determining that the UL transmission from the UE which is assigned with the second RS resource occupies less than a second predetermined ratio of the total UL resources.

15. The method according to claim 13, wherein the third RS group is a Sounding Reference Signal (SRS) group.

16. A network element, comprising:
    a processor;
    a memory storing instructions that, when executed by the processor, cause the network element to schedule an uplink (UL) reference signal (RS) resource for a multiuser multi-input-multi-output (MU-MIM()) enabled user equipment (UE), the instructions configuring the processor to:
    determine whether channel status information for the UE is known or not;
    assign a first RS resource from a first RS group to the UE in response to determining that the channel status information for the UE is unknown and that the first RS resource is not assigned to any other UE;
    assign a second RS resource from a second RS group to the UE in response to determining that the channel status information for the UE is known; and
    update channel status information for UEs for which first RS resources from the first RS group are assigned in response to determining that an MU-MIMO transmission is completed.

17. A non-transitory computer readable storage medium storing instructions that, when executed by one or more processors of a network element cause the network element to schedule an uplink (UL) reference signal (RS) resource for a multi-user multi-input-multi-output (MU-MIMO) enabled user equipment (UE), the instructions configuring the one or more processors to:
- determine whether channel status information for the UE is known or not;
- assign a first RS resource from a first RS group to the UE in response to determining that the channel status information for the UE is unknown and that the first RS resource is not assigned to any other UE; and
- assign a second RS resource from a second RS group to the UE in response to determining that the channel status information for the UE is known; and
- update channel status information for UEs for which first RS resources from the first RS group are assigned in response to determining that an MU-MIMO transmission is completed.

* * * * *